United States Patent
Xu et al.

(10) Patent No.: US 10,637,253 B2
(45) Date of Patent: Apr. 28, 2020

(54) COOPERATIVE CONTROL METHOD AND DEVICE FOR PHOTOVOLTAIC OPTIMIZER AND PHOTOVOLTAIC INVERTER

(71) Applicant: SUNGROW POWER SUPPLY CO., LTD., Hefei, Anhui (CN)

(72) Inventors: Jun Xu, Anhui (CN); Jiacai Zhuang, Anhui (CN); Yilei Gu, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 449 days.

(21) Appl. No.: 15/499,121

(22) Filed: Apr. 27, 2017

(65) Prior Publication Data
US 2018/0131321 A1 May 10, 2018

(30) Foreign Application Priority Data
Nov. 10, 2016 (CN) .......................... 2016 1 0989232

(51) Int. Cl.
*H02J 3/38* (2006.01)
(52) U.S. Cl.
CPC .............. *H02J 3/385* (2013.01); *H02J 3/383* (2013.01); *Y02E 10/563* (2013.01); *Y02E 10/58* (2013.01)
(58) Field of Classification Search
CPC ............ H02J 3/383; H02J 3/385; Y02E 10/58
See application file for complete search history.

(56) References Cited

U.S. PATENT DOCUMENTS 9,614,458 B1 * 4/2017 Alexander .......... H02M 7/5387
9,748,772 B2    8/2017 Bakas et al.
(Continued)

FOREIGN PATENT DOCUMENTS

CN          102624022 A     8/2012
CN          104253530 A    12/2014
(Continued)

OTHER PUBLICATIONS

Extended European Search Report corresponding to Application No. 17168470.7-1804; dated Dec. 7, 2017.
(Continued)

*Primary Examiner* — Carlos Amaya
*Assistant Examiner* — David A Shiao
(74) *Attorney, Agent, or Firm* — Cantor Colburn LLP

(57) ABSTRACT

A cooperative control method and device for a photovoltaic optimizer and a photovoltaic inverter are provided. The cooperative control method and device are applicable to a grid-connected photovoltaic system including N photovoltaic components, N photovoltaic optimizers and one photovoltaic inverter. The N photovoltaic components are respectively connected to input sides of the N photovoltaic optimizers, and output sides of the N photovoltaic optimizers are connected to a DC side of the photovoltaic inverter, N being an integer greater than or equal to 1. The cooperative control method includes determining an operation parameter of the grid-connected photovoltaic system; judging whether the operation parameter is lower than a preset value; and adjusting a voltage of the DC side of the photovoltaic inverter until the operation parameter is not lower than the preset value, in a case that the operation parameter is lower than the preset value.

4 Claims, 4 Drawing Sheets

(56) References Cited

U.S. PATENT DOCUMENTS

| | | | | |
|---|---|---|---|---|
| 2011/0160930 A1* | 6/2011 | Batten | ........................ | G05F 1/67 |
| | | | | 700/298 |
| 2012/0205974 A1* | 8/2012 | McCaslin | ................ | H02J 3/385 |
| | | | | 307/18 |
| 2014/0214230 A1* | 7/2014 | Gurudasani | ............... | H02J 3/00 |
| | | | | 700/297 |
| 2015/0372490 A1* | 12/2015 | Bakas | ..................... | H02J 3/385 |
| | | | | 307/52 |
| 2017/0117822 A1* | 4/2017 | Pahlevaninezhad | .... | H02J 3/385 |
| 2017/0222441 A1* | 8/2017 | Chen | ......................... | G05F 1/67 |
| 2017/0288410 A1* | 10/2017 | Ma | .......................... | H02J 3/383 |

FOREIGN PATENT DOCUMENTS

| | | |
|---|---|---|
| CN | 104734548 A | 6/2015 |
| CN | 105720915 A | 6/2016 |
| EP | 2957014 A | 8/2014 |
| JP | H10234185 A | 9/1998 |

OTHER PUBLICATIONS

SIPO First Office Action corresponding to Application No. 201610989232.3; dated May 24, 2018.

\* cited by examiner

COOPERATIVE CONTROL METHOD AND DEVICE FOR PHOTOVOLTAIC OPTIMIZER AND PHOTOVOLTAIC INVERTER

CROSS REFERENCE TO RELATED APPLICATION

The present application claims the priority to Chinese Patent Application No. 201610989232.3, entitled "COOPERATIVE CONTROL METHOD AND DEVICE FOR PHOTOVOLTAIC OPTIMIZER AND PHOTOVOLTAIC INVERTER", filed on Nov. 10, 2016 with the State Intellectual Property Office of the People's Republic of China, which is incorporated herein by reference in its entirety.

FIELD

The disclosure relates to the technical field of photovoltaic power generation, and particularly to a cooperative control method and a cooperative control device for a photovoltaic optimizer and a photovoltaic inverter.

BACKGROUND

FIG. 1 illustrates a grid-connected photovoltaic system, which includes N (N≥1) photovoltaic components 100, N photovoltaic optimizers 200 (which may have a bust topology or a bi-directional DC-DC conversion topology) and one photovoltaic inverter 300. The N photovoltaic components 100 are respectively connected to input sides of the N photovoltaic optimizers 200, and output sides of the N photovoltaic optimizers 200 are connected to a DC side of the photovoltaic inverter 300 (a case where N photovoltaic components 100 form one photovoltaic string is shown in FIG. 1 only as an example). Each photovoltaic optimizer 200 is used for performing Maximum Power Point Tracking (MPPT) control on the photovoltaic component 100 connected thereto, such that a component-level MPPT function can be implemented in the gird-connected photovoltaic system.

However, since the photovoltaic inverter 300 also has the MPPT function, an overall conversion efficiency of the gird-connected photovoltaic system may be reduced when the photovoltaic optimizer 200 in a preceding stage and the photovoltaic converter 300 in a succeeding stage on each branch perform MPPT control independently.

One of the branches (shown by the dotted box in FIG. 1) is taken as an example. On this branch, the photovoltaic optimizer 200 independently tracks a maximum output power of the photovoltaic component 100, and the photovoltaic inverter 300 independently tracks a maximum input power of the DC side of the photovoltaic inverter 300. When the photovoltaic optimizer 200 acquires the maximum output power of the photovoltaic component 100, the higher the voltage of the DC side of the photovoltaic inverter 300, the greater the duty cycle of photovoltaic optimizer 200; the greater the duty cycle of photovoltaic optimizer 200, the higher the conversion efficiency of the photovoltaic optimizer 200; and the higher the conversion efficiency of the photovoltaic optimizer 200, the greater the input power of the DC side of the photovoltaic inverter 300. Therefore, as a result of the photovoltaic inverter 300 independently tracking the maximum input power of the DC side, the voltage of the DC side of the photovoltaic inverter 300 is maintained at the maximum value. However, when the voltage of the DC side of the photovoltaic inverter 300 reaches the maximum value, the photovoltaic inverter 300 has the lowest conversion efficiency. Therefore, the overall conversion efficiency of the branch is not optimal, and even can be very low. Therefore, the overall conversion efficiency of the grid-connected photovoltaic system is low.

SUMMARY

In view of this, a cooperative control method and a cooperative control device for a photovoltaic optimizer and a photovoltaic inverter are provided according to the present disclosure, in order to enhance the overall conversion efficiency of the grid-connected photovoltaic system.

It is provided a cooperative control method for a photovoltaic optimizer and a photovoltaic inverter, which is applicable to a grid-connected photovoltaic system including N photovoltaic components, N photovoltaic optimizers and one photovoltaic inverter. The N photovoltaic components are respectively connected to input sides of the N photovoltaic optimizers, and output sides of the N photovoltaic optimizers are connected to a DC side of the photovoltaic inverter, N being an integer greater than or equal to 1. The cooperative control method includes:

determining an operation parameter of the grid-connected photovoltaic system, the operation parameter reflecting an overall conversion efficiency of the grid-connected photovoltaic system;

judging whether the operation parameter is lower than a preset value; and adjusting a voltage of the DC side of the photovoltaic inverter until the operation parameter is not lower than the preset value, in a case that the operation parameter is lower than the preset value.

The operation parameter may be an output power of an AC side of the photovoltaic inverter.

The operation parameter may be a product of $\eta_1$ and $\eta_2$, where $\eta_1$ is an average conversion efficiency of the N photovoltaic optimizers, and $\eta_2$ is a conversion efficiency of the photovoltaic inverter.

The determining the operation parameter of the grid-connected photovoltaic system may include:

acquiring the voltage of the DC side of the photovoltaic inverter, a grid voltage, a grid current, and output voltages of the N photovoltaic components;

determining $\eta_2$ based on the voltage of the DC side of the photovoltaic inverter, the grid voltage and the grid current;

calculating an average duty cycle of the N photovoltaic optimizers based on the output voltages of the N photovoltaic components and the voltage of the DC side of the photovoltaic inverter according to an equation:

the average duty cycle=the voltage of the DC side of the photovoltaic inverter/(a sum of the output voltages of the N photovoltaic components/M), where M is the number of strings formed by the N photovoltaic components;

determining $\eta_1$ based on the calculated average duty cycle; and calculating the product of $\eta_1$ and $\eta_2$.

The determining $\eta_2$ based on the voltage of the DC side of the photovoltaic inverter, the grid voltage and the grid current may include:

determining $\eta_2$ using a look-up table method in a case that the voltage of the DC side of the photovoltaic inverter, the grid voltage and the grid current are known, or calculating $\eta_2$ using a functional relationship between $\eta_2$ and the voltage of the DC side of the photovoltaic inverter, the grid voltage and the grid current; and the determining $\eta_1$ based on the calculated average duty cycle may include:

determining $\eta_1$ using a look-up table method in a case that the average duty cycle is known, or calculating $\eta_1$ using a functional relationship between $\eta_1$ and the average duty cycle.

It is provided a cooperative control device for a photovoltaic optimizer and a photovoltaic inverter, which is applicable to a grid-connected photovoltaic system including N photovoltaic components, N photovoltaic optimizers and one photovoltaic inverter. The N photovoltaic components are respectively connected to input sides of the N photovoltaic optimizers, and output sides of the N photovoltaic optimizers are connected to a DC side of the photovoltaic inverter, N being an integer greater than or equal to 1. The cooperative control device includes:

a parameter determination unit configured to determine an operation parameter of the grid-connected photovoltaic system, the operation parameter reflecting an overall conversion efficiency of the grid-connected photovoltaic system;

a judgment unit configured to judge whether the operation parameter is lower than a preset value; and an adjustment unit configured to adjust a voltage of the DC side of the photovoltaic inverter until the operation parameter is not lower than the preset value, in a case that the judgment unit determines that the operation parameter is lower than the preset value.

The operation parameter may be an output power of an AC side of the photovoltaic inverter.

The operation parameter may be a product of $\eta_1$ and $\eta_2$, where $\eta_1$ is an average conversion efficiency of the N photovoltaic optimizers, and $\eta_2$ is a conversion efficiency of the photovoltaic inverter.

The determination unit may include:

an acquisition unit configured to acquire the voltage of the DC side of the photovoltaic inverter, a grid voltage, a grid current and output voltages of the N photovoltaic components;

a first determination unit configured to determine $\eta_2$ based on the voltage of the DC side of the photovoltaic inverter, the grid voltage and the grid current acquired by the acquisition unit;

a first calculation unit configured to calculate an average duty cycle of the N photovoltaic optimizers based on the output voltages of the N photovoltaic components and the voltage of the DC side of the photovoltaic inverter acquired by the acquisition unit according to an equation:

the average duty cycle=the voltage of the *DC* side of the photovoltaic inverter/(a sum of the output voltages of the *N* photovoltaic components/*M*), where M is the number of strings formed by the N photovoltaic components;

a second determination unit configured to determine $\eta_1$ based on the average duty cycle calculated by the first calculation unit; and a second calculation unit configured to calculate the product of $\eta_1$ and $\eta_2$.

The first determination unit may be configured to:

determine $\eta_2$ using a look-up table method in a case that the voltage of the DC side of the photovoltaic inverter, the grid voltage and the grid current are known, or calculate $\eta_2$ using a functional relationship between $\eta_2$ and the voltage of the DC side of the photovoltaic inverter, the grid voltage and the grid current; and the second determination unit may be configured to:

determine $\eta_1$ using a look-up table method in a case that the average duty cycle is known, or calculate $\eta_1$ using a functional relationship between and the average duty cycle.

As can be seen from the above technical solution, a match condition between the conversion efficiency of the photovoltaic invertor and the conversion efficiency of the photovoltaic optimizer can be changed by adjusting the voltage of the DC side of the photovoltaic inverter. Therefore, only in a case that the photovoltaic inverter operates with the voltage of the DC side being a specific value, the grid-connected photovoltaic system can achieve the maximum overall conversion efficiency. The specific value of the voltage of the DC side is referred to as an optimum match point. Therefore, in the present disclosure, the voltage of the DC side of the photovoltaic inverter is adjusted to be close to the optimum match point, to enhance the overall conversion efficiency of the grid-connected photovoltaic system.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

Hereinafter, the technical solution in the embodiments of the present disclosure will be described clearly and completely in conjunction with the drawings in the embodiments of the present disclosure. Obviously, the described embodiments are only a part of the embodiments of the present disclosure, but not all the embodiments. All the other embodiments obtained by those skilled in the art based on the embodiments of the present disclosure without creative work will fall within the scope of protection of the present disclosure.

Figure 1:
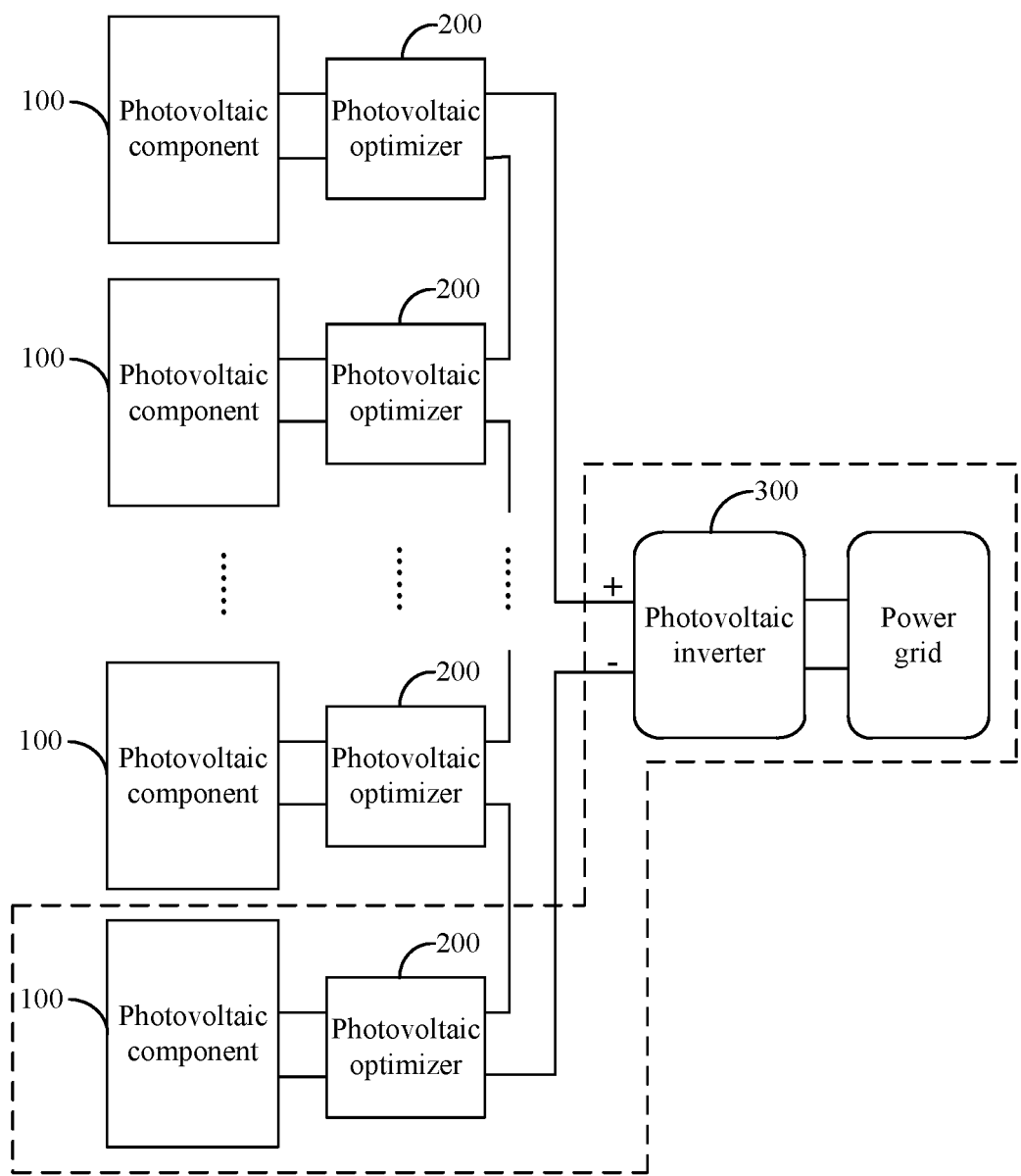
FIG. 1 is a schematic structural diagram of a grid-connected photovoltaic system according to the conventional technology.
Figure 2:
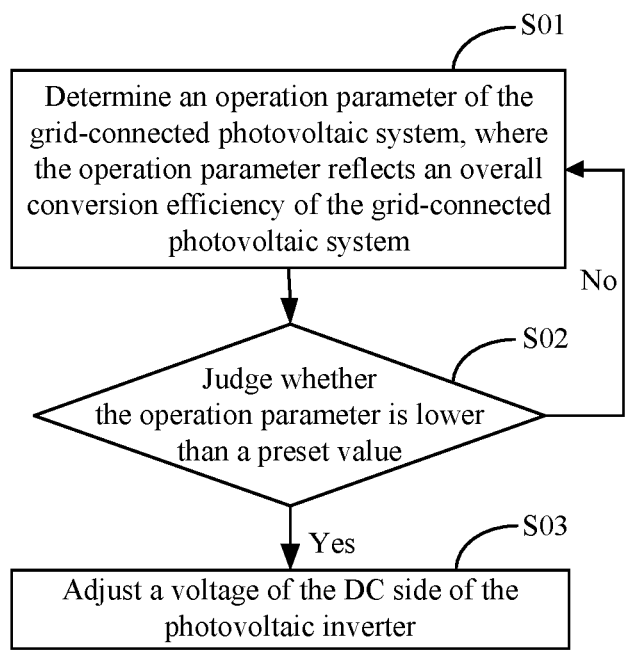
FIG. 2 is a flow chart of a cooperative control method for a photovoltaic optimizer and a photovoltaic inverter according to an embodiment of the present disclosure.

A cooperative control method for a photovoltaic optimizer and a photovoltaic inverter is provided according to an embodiment of the present disclosure. The cooperative control method is applicable to the grid-connected photovoltaic system shown in FIG. 1, for enhancing the overall conversion efficiency of the grid-connected photovoltaic system. Referring to FIG. 2, the cooperative control method includes the following steps S01 to S03.

In step S01, an operation parameter of the grid-connected photovoltaic system is determined. The operation parameter reflects an overall conversion efficiency of the grid-connected photovoltaic system.

The photovoltaic inverter 300 and the N photovoltaic optimizer 200 are considered as an integral unit (referred to as unit A). The overall conversion efficiency of the grid-connected photovoltaic system is reflected by the conversion efficiency of the unit A.

The conversion efficiency of the unit A is equal to a product of the average conversion efficiency $\eta_1$ of the N photovoltaic optimizers 200 and the conversion efficiency $\eta_2$ of the photovoltaic inverter 300, i.e., $\eta_1 \times \eta_2$. Correspondingly, the operation parameter may be $\eta_1 \times \eta_2$.

Figure 3:
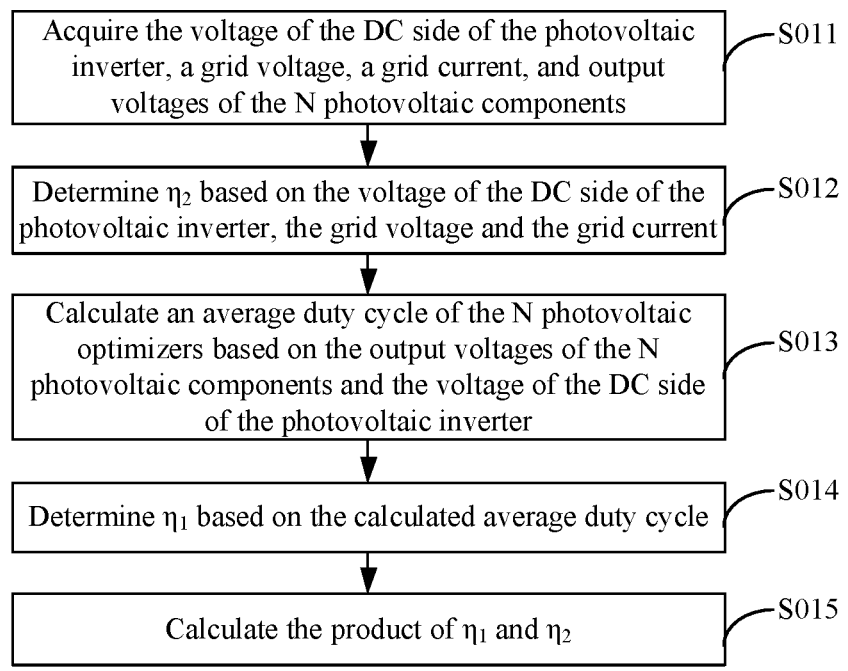
FIG. 3 is a flow chart of a method for determining an operation parameter of a grid-connected photovoltaic system according to an embodiment of the present disclosure.

Referring to FIG. 3, in a case that the operation parameter is $\eta_1 \times \eta_2$, the method for determining the operation parameter includes the following steps S011 to S015.

In step S011, a voltage of a DC side of the photovoltaic inverter 300, a grid voltage, a grid current, and output voltages of the N photovoltaic components 100 are acquired.

In step S012, $\eta_2$ is determined based on the voltage of the DC side of the photovoltaic inverter 300, the grid voltage and the grid current.

$\eta_2$ may be determined using a look-up table method in a case that the voltage of the DC side of the photovoltaic inverter 300, the grid voltage and the grid current are known. Alternatively, $\eta_2$ may be calculated using a functional relationship between $\eta_2$ and the voltage of the DC side of the photovoltaic inverter 300, the grid voltage and the grid current, which may be expressed as $\eta_2$=f(the voltage of the DC side of the photovoltaic inverter 300, the grid voltage, the grid current).

In step S013, an average duty cycle of the N photovoltaic optimizers 200 is calculated based on the output voltages of the N photovoltaic components 100 and the voltage of the DC side of the photovoltaic inverter 300 according to an equation:

the average duty cycle=the voltage of the DC side of the photovoltaic inverter 300/(a sum of the output voltages of the N photovoltaic components 100/M), where M is the number of strings formed by the N photovoltaic components 100.

In step S014, $\eta_1$ is determined based on the calculated average duty cycle.

$\eta_1$ may be determined using a look-up table method in a case that the average duty cycle of the N photovoltaic optimizers 200 is known. Alternatively, $\eta_1$ may be calculated using a functional relationship between $\eta_1$ and the average duty cycle of the N photovoltaic optimizers 200.

In step S105, the product of $\eta_1$ and $\eta_2$ is calculated.

In addition, the overall conversion efficiency of the unit A may be reflected by an output power of the AC side of the photovoltaic inverter 300. That is, the operation parameter may also be the output power of the AC side of the photovoltaic inverter 300.

The reason for which the operation parameter may also be the output power of the AC side of the photovoltaic inverter 300 is as follows. When each of the photovoltaic optimizer 200 acquires the maximum output power of the photovoltaic component 100 connected thereto, it can be considered that the photovoltaic energy outputted into the unit A is a set value. In this operation condition, if the output power of the AC side of the photovoltaic inverter 300 is greater, it indicates that the conversion efficiency of the unit A is higher. Therefore, the output power of the AC side of the photovoltaic inverter 300 may be collected, and the conversion efficiency of the unit A may be determined according to the output power of the AC side of the photovoltaic inverter 300.

In step S02, it is judged whether the operation parameter is lower than a preset value. In a case that the operation parameter is lower than the preset value, it indicates that the overall conversion efficiency of the grid-connected photovoltaic system is low and needs to be optimized, then the process proceeds to step S03. In a case that the operation parameter is not lower than the preset value, it indicates that the overall conversion efficiency of the grid-connected photovoltaic system is high and does not need to be adjusted, then the process returns to step S01.

In step S03, the voltage of the DC side of the photovoltaic inverter 300 is adjusted until the operation parameter is not lower than the preset value.

It is known that, for the photovoltaic inverter 300, at a same output power of the AC side, the higher the input voltage of the DC side, the greater the internal switch loss of the photovoltaic inverter 300, thereby and the lower the conversion efficiency of the photovoltaic inverter 300. Therefore, a variation in the voltage of the DC side of the photovoltaic inverter 300 can result in a variation in the conversion efficiency of the photovoltaic inverter 300.

In addition, when the photovoltaic optimizer 200 acquires the maximum output power of the photovoltaic component 100, it may be considered that the input voltage of the photovoltaic optimizer 200 is a set value. At this time, the variation in the voltage of the DC side of the photovoltaic inverter 300 can also result in a variation in the duty cycle of the photovoltaic optimizer 200, and the variation in the duty cycle of the photovoltaic optimizer 200 can in turn directly influence the conversion efficiency of the photovoltaic optimizer 200. Therefore, the variation in the voltage of the DC side of the photovoltaic inverter 300 can result in the variation in the conversion efficiency of each photovoltaic optimizer 200.

As can be seen, the conversion efficiency of the photovoltaic inverter 300 and the conversion efficiency of each photovoltaic optimizer 200 both may be changed by adjusting the voltage of the DC side of the photovoltaic inverter 300. In addition, the match condition between the conversion efficiency of the photovoltaic inverter 300 and the conversion efficiency of each photovoltaic optimizer 200 can directly influence the overall conversion efficiency of the grid-connected photovoltaic system. Only in a case that the photovoltaic inverter 300 operates with the voltage of the DC side being a specific value, the overall conversion efficiency of the grid-connected photovoltaic system can reach the maximum value (in this case, the conversion efficiency of the photovoltaic inverter 300 and the conversion efficiency each photovoltaic optimizer 200 can achieve an optimal match condition, and the specific value of the voltage of the DC side is referred to as the optimal match point). Therefore, in order to enhance the overall conversion efficiency of the grid-connected photovoltaic system, the voltage of the DC side of the photovoltaic inverter 300 is required to be adjusted to be close to the optimal match point.

Figure 4:
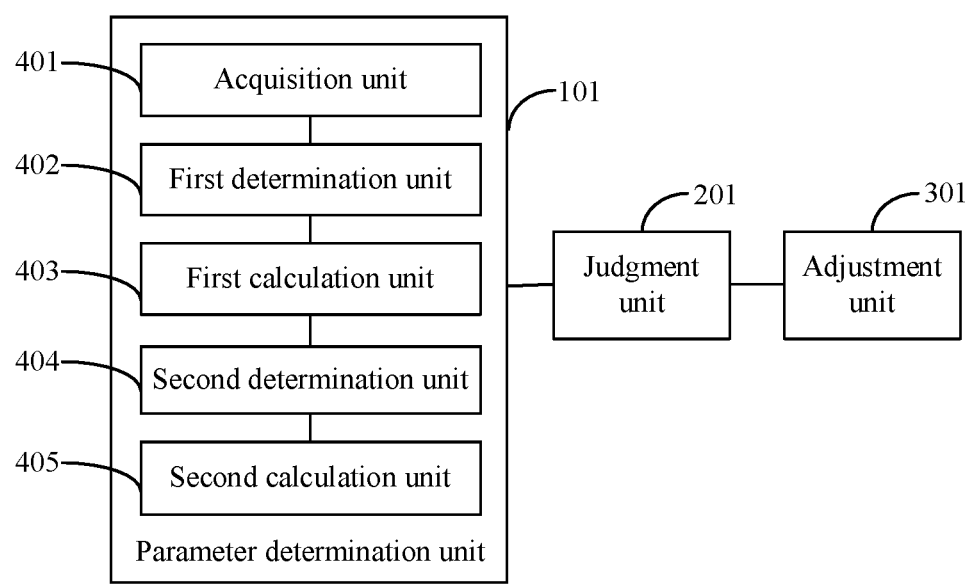
FIG. 4 is a schematic structural diagram of a cooperative control device for a photovoltaic optimizer and a photovoltaic inverter according to an embodiment of the present disclosure.

A cooperative control device for a photovoltaic optimizer and a photovoltaic inverter is further provided according to an embodiment of the present disclosure. The cooperative control device is applicable to the grid-connected photovoltaic system shown in FIG. 1, for enhancing the overall conversion efficiency of the grid-connected photovoltaic system. As shown in FIG. 4, the cooperative control device includes a parameter determination unit 101, a judgment unit 201, and an adjustment unit 301.

The parameter determination unit 101 is configured to determine an operation parameter of the grid-connected photovoltaic system. The operation parameter reflects an overall conversion efficiency of the grid-connected photovoltaic system.

The judgment unit 201 is configured to judge whether the operation parameter is lower than a preset value.

The adjustment unit 301 is configured to adjust a voltage of the DC side of the photovoltaic inverter 300 until the operation parameter is not lower than the preset value, in a case that the judgment unit 201 determines that the operation parameter is lower than the preset value.

The operation parameter is an output power of an AC side of the photovoltaic inverter 300.

The operation parameter is a product of $\eta_1$ and $\eta_2$. Specifically, $\eta_1$ is an average conversion efficiency of the N photovoltaic optimizers 200, and $\eta_2$ is a conversion efficiency of the photovoltaic inverter 300.

Reference is made to FIG. 4 again. The parameter determination unit 101 includes an acquisition unit 401, a first determination unit 402, a first calculation unit 403, a second determination unit 404, and a second calculation unit 405.

The acquisition unit 401 is configured to acquire the voltage of the DC side of the photovoltaic inverter 300, a grid voltage, a grid current and output voltages of the N photovoltaic components 100.

The first determination unit 402 is configured to determine $\eta_2$ based on the voltage of the DC side of the photovoltaic inverter 300, the grid voltage and the grid current acquired by the acquisition unit 401.

The first calculation unit 403 is configured to calculate an average duty cycle of the N photovoltaic optimizers 200 based on the output voltages of the N photovoltaic components 100 and the voltage of the DC side of the photovoltaic inverter 300 acquired by the acquisition unit 401 according to an equation:

the average duty cycle=the voltage of the DC side of the photovoltaic inverter 300/(a sum of the output voltages of the N photovoltaic components 100/M), where M is the number of strings formed by the N photovoltaic components 100.

The second determination unit 404 is configured to determine $\eta_1$ based on the average duty cycle calculated by the first calculation unit 403.

The second calculation unit 405 is configured to calculate the production of $\eta_1$ and $\eta_2$.

The first determination unit 402 is configured to determine $\eta_2$ using a look-up table method in a case that the voltage of the DC side of the photovoltaic inverter 300, the grid voltage and the grid current are known. Alternatively, the first determination unit 402 is configured to calculate $\eta_2$ using a functional relationship between $\eta_2$ and the voltage of the DC side of the photovoltaic inverter 300, the grid voltage and the grid current.

Specifically, the second determination unit 404 is configured to determine $\eta_1$ using a look-up table method in a case that the average duty cycle is known. Alternatively, the second determination unit 404 is configured to calculate $\eta_1$ using a functional relationship between $\eta_1$ and the average duty cycle.

In summary, the match condition between the conversion efficiency of the photovoltaic inverter and the conversion efficiency of the photovoltaic optimizer can be changed by adjusting the voltage of the DC side of the photovoltaic inverter. Only in a case that the photovoltaic inverter operates with the voltage of the DC side being a specific value, the overall conversion efficiency of the grid-connected photovoltaic system can reach the maximum value. The specific value of the voltage of the DC side is referred to as the optimal match point. Therefore, in order to enhance the overall conversion efficiency of the grid-connected photovoltaic system, the voltage of the DC side of the photovoltaic inverter is adjusted to be close to the optimal match point in the present disclosure.

In the present specification, the embodiments are described in progressive manner. Each embodiment mainly focuses on an aspect different from other embodiments, and reference can be made to these similar parts among the embodiments. The device disclosed in the embodiment corresponds to the method disclosed in the embodiment, and is described relatively simply. For detailed description of the device, reference may be made to the related description of the method.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A cooperative control method for a photovoltaic optimizer and a photovoltaic inverter, applicable to a grid-connected photovoltaic system comprising N photovoltaic components, N photovoltaic optimizers and one photovoltaic inverter, the N photovoltaic components being respectively connected to input sides of the N photovoltaic optimizers, and output sides of the N photovoltaic optimizers being connected to a DC side of the photovoltaic inverter, N being an integer greater than or equal to 1, the cooperative control method comprising:

determining an operation parameter of the grid-connected photovoltaic system, the operation parameter reflecting an overall conversion efficiency of the grid-connected photovoltaic system;

judging whether the operation parameter is lower than a preset value; and adjusting a voltage of the DC side of the photovoltaic inverter until the operation parameter is not lower than the preset value, in a case that the operation parameter is lower than the preset value, wherein the operation parameter is a product of $\eta_1$ and $\eta_2$, $\eta_1$ is an average conversion efficiency of the N photovoltaic optimizers, and $\eta_2$ is a conversion efficiency of the photovoltaic inverter; and wherein the determining the operation parameter of the grid-connected photovoltaic system comprises:

acquiring the voltage of the DC side of the photovoltaic inverter, a grid voltage, a grid current, and output voltages of the N photovoltaic components;

determining $\eta_2$ based on the voltage of the DC side of the photovoltaic inverter, the grid voltage and the grid current, calculating an average duty cycle of the N photovoltaic optimizers based on the output voltages of the N photovoltaic components and the voltage of the DC side of the photovoltaic inverter according to an equation:

the average duty cycle=the voltage of the *DC* side of the photovoltaic inverter/(a sum of the output voltages of the *N* photovoltaic components/*M*), wherein M is the number of strings formed by the N photovoltaic components;
determining $\eta_1$ based on the calculated average duty cycle; and
calculating the product of $\eta_1$ and $\eta_2$.

2. The cooperative control method according to claim 1, wherein:
the determining $\eta_2$ based on the voltage of the DC side of the photovoltaic inverter, the grid voltage and the grid current comprises:
   determining $\eta_2$ using a look-up table method in a case that the voltage of the DC side of the photovoltaic inverter, the grid voltage and the grid current are known, or
   calculating $\eta_2$ using a functional relationship between $\eta_2$ and the voltage of the DC side of the photovoltaic inverter, the grid voltage and the grid current; and
the determining $\eta_1$ based on the calculated average duty cycle comprises:
   determining $\eta_1$ using a look-up table method in a case that the average duty cycle is known, or
   calculating $\eta_1$ using a functional relationship between $\eta_1$ and the average duty cycle.

3. A cooperative control device for a photovoltaic optimizer and a photovoltaic inverter, applicable to a grid-connected photovoltaic system comprising N photovoltaic components, N photovoltaic optimizers and one photovoltaic inverter, the N photovoltaic components being respectively connected to input sides of the N photovoltaic optimizers, and output sides of the N photovoltaic optimizers being connected to a DC side of the photovoltaic inverter, N being an integer greater than or equal to 1, the cooperative control device comprising:
   a parameter determination unit configured to determine an operation parameter of the grid-connected photovoltaic system, the operation parameter reflecting an overall conversion efficiency of the grid-connected photovoltaic system;
   a judgment unit configured to judge whether the operation parameter is lower than a preset value; and
   an adjustment unit configured to adjust a voltage of the DC side of the photovoltaic inverter until the operation parameter is not lower than the preset value, in a case that the judgment unit determines that the operation parameter is lower than the preset value;
wherein the operation parameter is a product of $\eta_1$ and $\eta_2$, $\eta_1$ is an average conversion efficiency of the N photovoltaic optimizers, and $\eta_2$ is a conversion efficiency of the photovoltaic inverter; and
wherein the determination unit comprises:
   an acquisition unit configured to acquire the voltage of the DC side of the photovoltaic inverter, a grid voltage, a grid current and output voltages of the N photovoltaic components;
   a first determination unit configured to determine q based on the voltage of the DC side of the photovoltaic inverter, the grid voltage and the grid current acquired by the acquisition unit;
   a first calculation unit configured to calculate an average duty cycle of the N photovoltaic optimizers based on the output voltages of the N photovoltaic components and the voltage of the DC side of the photovoltaic inverter acquired by the acquisition unit according to an equation:

the average duty cycle=the voltage of the *DC* side of the photovoltaic inverter/(a sum of the output voltages of the *N* photovoltaic components/*M*), wherein M is the number of strings formed by the N photovoltaic components;
   a second determination unit configured to determine $\eta_1$ based on the average duty cycle calculated by the first calculation unit; and
   a second calculation unit configured to calculate the product of $\eta_1$ and $\eta_2$.

4. The cooperative control device according to claim 3, wherein:
the first determination unit is configured to:
   determine $\eta_2$ using a look-up table method in a case that the voltage of the DC side of the photovoltaic inverter, the grid voltage and the grid current are known, or
   calculate $\eta_2$ using a functional relationship between $\eta_2$ and the voltage of the DC side of the photovoltaic inverter, the grid voltage and the grid current; and
the second determination unit is configured to:
   determine $\eta_1$ using a look-up table method in a case that the average duty cycle is known, or
   calculate $\eta_1$ using a functional relationship between $\eta_1$ and the average duty cycle.

\* \* \* \* \*